(12) United States Patent
Chudoba et al.

(10) Patent No.: US 6,503,422 B2
(45) Date of Patent: Jan. 7, 2003

(54) METHOD OF FABRICATING HOLDING DEVICES FOR FIBER OPTIC CONNECTOR FERRULES

(75) Inventors: Paul Chudoba, Shohola, PA (US); Jerome Polizzi, Morrisville, PA (US)

(73) Assignee: NuVisions International, Shohola, PA (US)

( * ) Notice: Subject to any disclaimer, the term of this patent is extended or adjusted under 35 U.S.C. 154(b) by 25 days.

(21) Appl. No.: 09/809,514

(22) Filed: Mar. 15, 2001

(65) Prior Publication Data

US 2002/0131720 A1 Sep. 19, 2002

(51) Int. Cl.[7] .............................................. B29D 11/00
(52) U.S. Cl. ........................................ 264/1.25; 29/464
(58) Field of Search ................................ 264/1.25, 1.1; 385/55, 70, 60, 140; 29/868, 428, 464

(56) References Cited

U.S. PATENT DOCUMENTS

| | | | | |
|---|---|---|---|---|
| 4,205,898 A | * | 6/1980 | Matthews et al. | |
| 4,690,494 A | * | 9/1987 | Hirose et al. | |
| 4,708,433 A | * | 11/1987 | Kakii et al. | |
| 4,711,752 A | * | 12/1987 | Deacon et al. | 264/1.25 |
| 5,050,956 A | * | 9/1991 | Carpenter et al. | |
| 6,273,619 B1 | * | 8/2001 | Shahid et al. | 385/70 |
| 6,284,160 B1 | * | 9/2001 | Kiernicki et al. | 264/1.25 |

* cited by examiner

Primary Examiner—Mathieu D. Vargot
(74) Attorney, Agent, or Firm—George R. McGuire; Hancock & Estabrook, LLP

(57) ABSTRACT

A method of fabricating a device for engaging and holding two ferrules of respective optical fiber connectors in axial alignment for transmission of a beam from the fiber of one ferrule to the other. A pair of ferrules made to close tolerances and having no fibers in their central, axial passageways are inserted into a corresponding pair of cylindrical split sleeves in end-to-end relation, and a precision gauge in the form of an elongated wire having a diameter substantially equal to the inside diameter of the ferrule passageways is inserted therethrough. The two sleeves are then positioned and permanently fixed within a surrounding structure. In a first embodiment, the sleeves are placed in a mold cavity into which a potting agent is injected to surround the sleeves. When the potting agent hardens, it is removed, together with the sleeves, ferrules and gauge, from the mold. In a second embodiment, a quick drying epoxy is applied to the outside surfaces of the sleeves, which are then placed in a stainless steel cylinder, and the epoxy is allowed to dry. In both embodiments, the gauge is then withdrawn from the ferrules, and the ferrules are removed from the sleeves which remain in the potting agent or cylinder in precisely axially aligned relation. The device, consisting of the two sleeves and body portion formed by either the hardened potting agent or the cylinder with epoxy, is then ready for use in holding ferrules of other connectors with their respective fibers in axial alignment for transmission of a 9 micron beam from one fiber to the other.

13 Claims, 3 Drawing Sheets

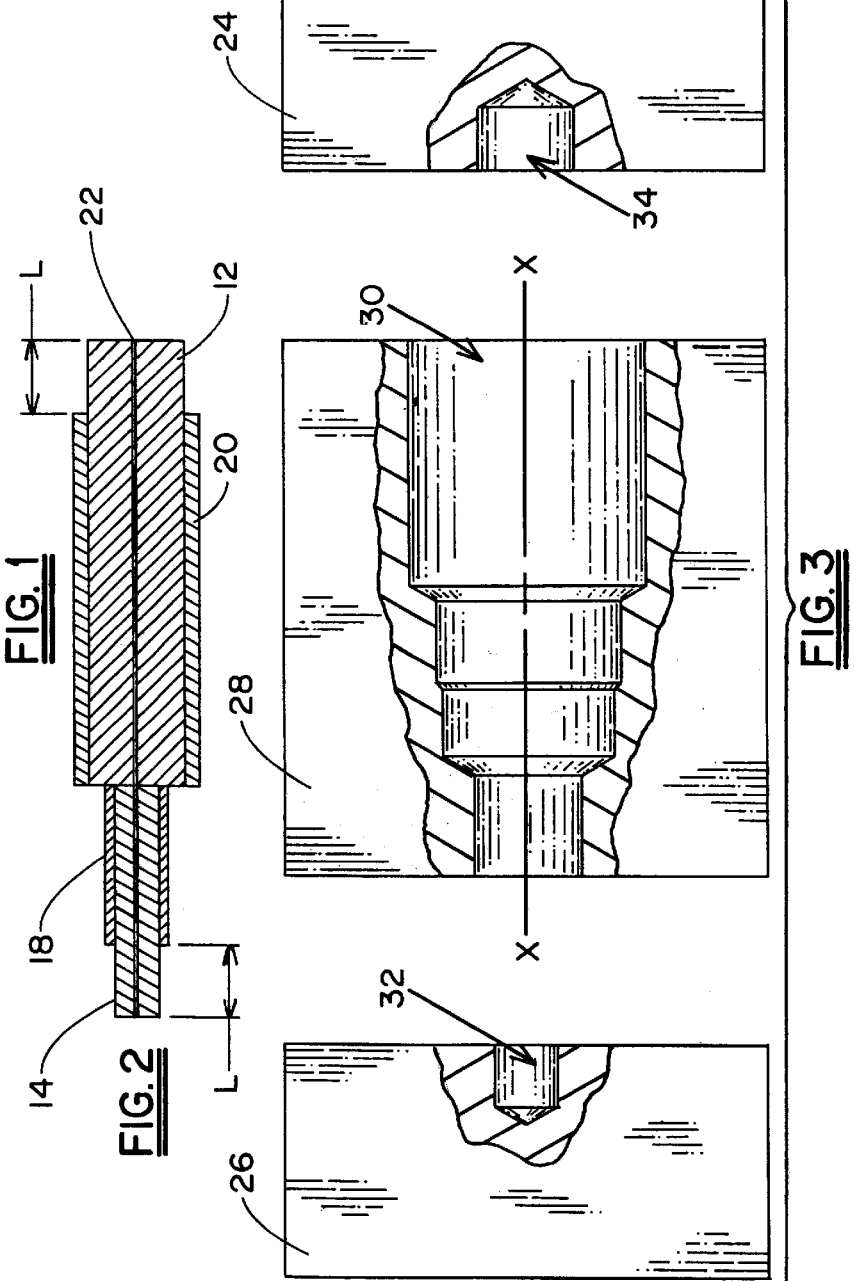

METHOD OF FABRICATING HOLDING DEVICES FOR FIBER OPTIC CONNECTOR FERRULES

BACKGROUND OF THE INVENTION

The present invention relates to methods of fabricating devices for holding a pair of axial ferrules of optical fiber connectors in opposing, axially aligned relation. More specifically, the invention relates to a method of forming a device having a pair of split sleeves for frictionally engaging respective ferrules of optical fiber connectors to ensure essentially exact axial alignment of the sleeves.

Several types or models of optical fiber connectors have been adopted as "industry standard," such as those commonly designated SC, FC, biconic, D4, etc. All connectors of this family include a so-called ferrule in the form of a cylindrical rod having a through, axial passageway wherein an optical fiber is positioned. It is often necessary to place the ferrules of two connectors in axial alignment with the free ends of the ferrules either in direct, mutual contact or spaced by a predetermined distance for controlled attenuation of light transmitted from the optical fiber of one ferrule to the other. The ferrules are maintained in this position by being axially inserted into respective split sleeves of a unitary body wherein the sleeves are positioned. The sleeves have inside diameters substantially equal to, or slightly less than, the outside diameters of the ferrules they are designed to hold. The two sleeves may be the of same or of different diameters. The outer diameter of the ferrules, as well as the diameter of the passageway through which the fiber extends and the concentricity of these diameters, is maintained within strict tolerances. However, transmission of the light beam (commonly 9mu) is unacceptably degraded if the axes of the split sleeves which hold the ferrules are not in very close alignment.

The present invention provides a method of fabricating the holding devices in a manner which ensures substantially exact axial alignment of the split sleeves in such devices.

SUMMARY OF THE INVENTION

A pair of ferrules having outside diameters corresponding to those of the ferrules to be held by the device are provided. Although the diameters of the two ferrules may be the same, the present invention will be shown and described in an embodiment wherein the ferrules have different outside diameters. The ferrules have the usual, central passageway, but no optical fiber is positioned therein. Rather, a gauge in the form of an elongated wire or filament having a diameter equal to the diameters of the ferrule passageways (which are equal to one another) is inserted through the passageway of both ferrules, thus placing the ferrules in precise axial alignment. Split sleeves which have inside diameters approximately equal to or slightly smaller than the outside diameters of the ferrules are then installed on and frictionally engage the ferrules. The ferrules have axial lengths in excess of the axial lengths of the sleeves, whereby, when the ferrules have one end positioned flush with the opposing ends of the sleeves, the outer ends of the ferrules extend past the outer ends of the sleeves. Because the ferrules are carefully checked to ensure that they conform to tight tolerances both as to outside and inside diameter and to concentricity, the axes of the two split sleeves engaging the ferrules are necessarily in essentially exact alignment.

In a first embodiment of the invention, a mold having a central cavity is prepared, preferably in three sections, a top, a central body and a bottom. The central body section includes a cavity having a central axis and a larger radial cross section than the split sleeves. The cavity is preferably circular in radial cross section, either of uniform diameter or of two or more different diameters throughout its length. The top and bottom sections each include a cylindrical cavity extending into the side which mates with the body section and having a diameter substantially equal to that of a respective ferrule and a depth equal to the axial length of portion of the ferrule which extends from the split sleeve. The axial length of the body section is substantially equal to the axial distance between the outer ends of the split sleeves. Thus, when the assembly consisting of the two ferrules, the two split sleeves and the elongated gauge is placed within the cavity of the body section, the ends of the two ferrules project from opposite ends of the body for distances equal to the depths of the cylindrical cavities in the top and bottom mold sections.

The three sections are assembled by inserting the outer ends of the ferrules into the respective cavities of the top and bottom sections, which are aligned with the central axis of the body section. The split sleeves are suspended within the cavity of the body section in spaced relation to the walls thereof. A suitable plastic or other potting agent in flowable form is then injected into the die cavity of the central section, surrounding the split sleeves. When the potting agent hardens, the top and bottom mold sections are removed and the molded article is removed from the center section cavity. The ferrules and gauge are withdrawn, leaving the split sleeves within the molded body in precisely coaxial relation. The holding device is then ready for use with optical fiber connectors having ferrules with outer diameters corresponding to the inner diameters of the split sleeves of the device.

In a second embodiment, the ferrules, split sleeves and gauge are mutually assembled in the same manner as in the first embodiment. The split sleeves are then coated with a quick drying epoxy and inserted into a stainless steel cylinder having an inside diameter a few thousandths of an inch less than the outside diameter of the largest of the split sleeves. Sufficient epoxy is applied to ensure that the space between the inside surface of the cylinder and the outside surface of the sleeves is substantially filled with epoxy. When the epoxy has dried (solidified) the gauge is removed from the ferrules and the ferrules are removed from the sleeves, leaving the sleeves permanently encased in the cylinder in essentially exact axial alignment.

The foregoing and other features of the invention will be more readily understood and fully appreciated from the following detailed description, taken in conjunction with the accompanying drawings.

BRIEF DESCRIPTION OF THE DRAWINGS

FIG. 1 is an exploded perspective, side elevational view, in cross section, of elements used in the fabrication of holding devices according to the invention;

FIG. 2 is a sectional, side elevational view of the elements of FIG. 1 in assembled relation;

FIG. 3 is an exploded, side elevational view, in cross section, of a mold used in a first embodiment of the fabrication method of the invention;

DETAILED DESCRIPTION

Figure 4:
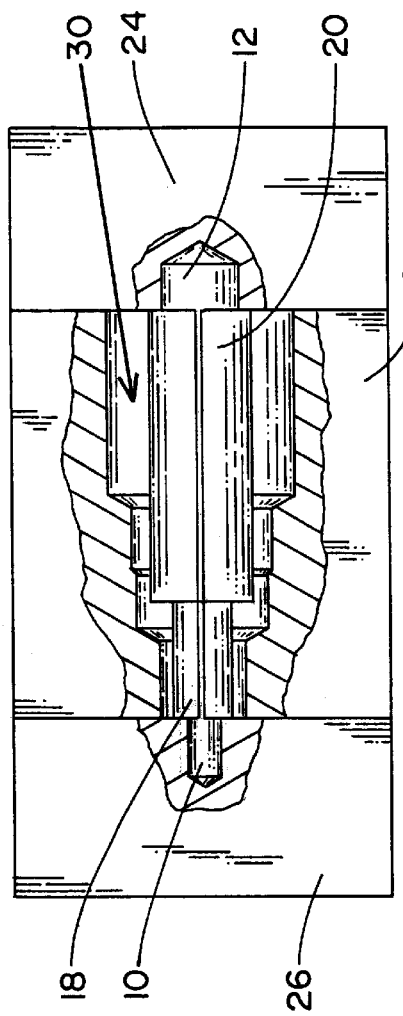
FIG. 4 is a sectional, side elevationl view of the mold components os FIG. 3 with the assembled elements of FIG. 2 positioned therein.

Referring now to the drawings, in FIG. 1 are shown first and second, cylindrical ferrules 10 and 12, respectively, corresponding in configuration to ferrules used in industry-standard fiber optic connectors. Ferrules 10 and 12, in the illustrated embodiment, have different outside diameters, e.g., 1.25 mm and 2.5 mm, although for purposes of the present invention, the outside diameters may be equal. The optical fibers which pass through the ferrules of conventional connectors are of the same diameter regardless of the outside diameter of the ferrule. Therefore, ferrules 10 and 12 are provided with through passageways 14 and 16, respectively, of equal inside diameter, e.g., 126 microns. The central axes of passageways 14 and 16 are coaxial, within a very close tolerance, with the central axes of the outside diameters of the ferrules. Hollow, cylindrical bushings 18 and 20 are formed in conventional fashion with inside diameters equal to or slightly less than the outside diameters of ferrules 10 and 12, respectively. Axial slits 17 and 19 in bushings 18 and 20, respectively, permit radial expansion from an unflexed position upon axial insertion of a ferrule into the bushing. Thus, such bushings are commonly known as split sleeves and are so termed hereinafter. The other element shown in FIG. 1 is precision gauge 22, in the form of a filamentary or wire-like element having a diameter equal to the inside diameter of passageways 14 and 16.

As a preliminary step in the fabrication method of the invention, the elements of FIG. 1 are mutually assembled in the manner illustrated in FIG. 2. That is, ferrules 10 and 12 are axially inserted into split sleeves 18 and 20, respectively, and gauge 22 is inserted through passageways 14 and 16. It will be noted that ferrules 10 and 12 have axial lengths greater than the axial lengths of the split sleeves into which they are inserted. In the illustrated embodiment, the inner or opposing ends of ferrules 10 and 12 are in mutually contacting relation in the plane of the opposing ends of split sleeves 18 and 20. The outer ends of the ferrules extend past the outer ends of the split sleeves by equal axial distances indicated by the letter L. Gauge 22 has a length substantially equal to the combined axial lengths of ferrules 10 and 12, although it may be somewhat longer if desired.

In FIG. 3 is shown a mold constructed in three sections, namely, top and bottom sections 24 and 26, respectively, and central body section 28. Central cavity 30, symmetrical about central axis X—X, extends through body section 28. Cylindrical cavity 32, having a diameter substantially equal to the outside diameter of ferrule 10 and axial length L, extends into the side of bottom section 26 which mates with or abuts body section 28 in the assembled condition of the mold. Cylindrical cavity 34 has a diameter substantially equal to the outside diameter of ferrule 12 and an axial length L. The central axes of cavities 32 and 34 are coaxial with axis X—X when the mold sections are assembled, as illustrated in FIG. 4. As the mold sections are assembled, the outer ends of ferrules 10 and 12 are inserted in cavities 32 and 34, respectively. Thus,. split sleeves 18 and 20, and the portions of ferrules 10 and 12 positioned therein, are suspended within cavity 30. Although cavity 30 is shown as having several different diameters along its axial length, it is larger in radial cross section at any axial position than the portion of the split sleeves which it surrounds. That is, the wall(s) of cavity 30 is in outwardly spaced relation to split sleeves 18 and 20.

Figure 5:
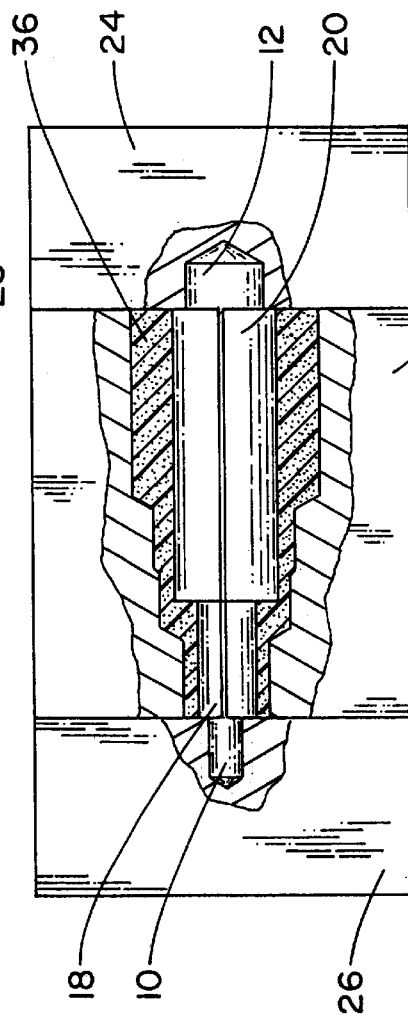
FIG. 5 is the same view as FIG. 4 after injection into the mold cavity of a potting agent.
Figure 6:
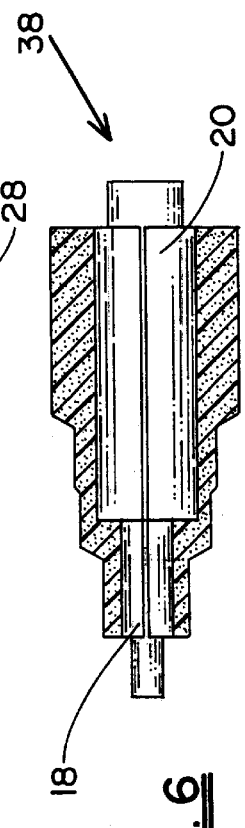
FIG. 6 is a sectional, side elevational view of the holding device fabricated according to the first embodiment of the invention.

With the elements in the position of FIG. 4, a potting agent, of plastic or other suitable material in flowable form, is injected into cavity 30 to fill the space between split sleeves 18 and 20 and the wall(s) of cavity 30. Potting agent 36 is shown in this condition in FIG. 5. Upon hardening of potting agent 36, top and bottom section 24 and 26 are axially moved away from body section 28. Ferrules 10 and 12 are axially withdrawn from split sleeves 18 and 20, along with gauge 22. The ferrule holding device, comprising split sleeves 18 and 20 and the body portion formed by hardened potting agent 36, is indicated generally in FIG. 6 by reference numeral 38. Device 38 is ready for use upon removal from the mold. The optical fibers of any two ferrules having outside diameters corresponding to the inside diameters of split sleeves 18 and 20, and within prescribed tolerances as to concentricity of the fibers within the outside diameters of the ferrules, will be assured of proper beam transmission from one fiber to the other when held by device 38.

Figure 7:
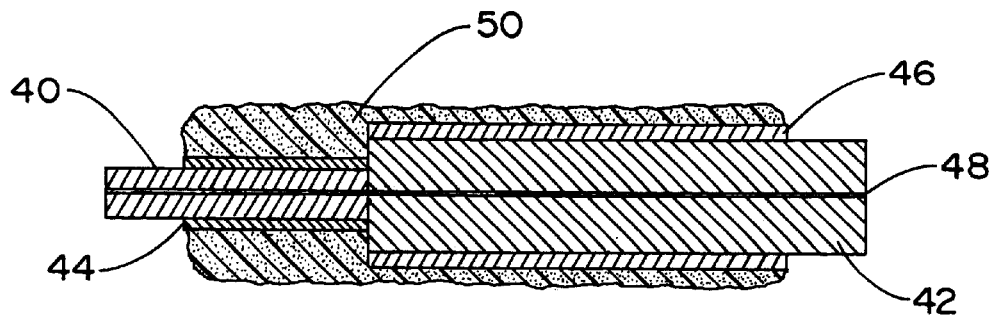
FIGS. 7–9 are a side elevational views, in sesction, illustrating successive steps in a second disclosed embodiment of the invention.
Figure 8:
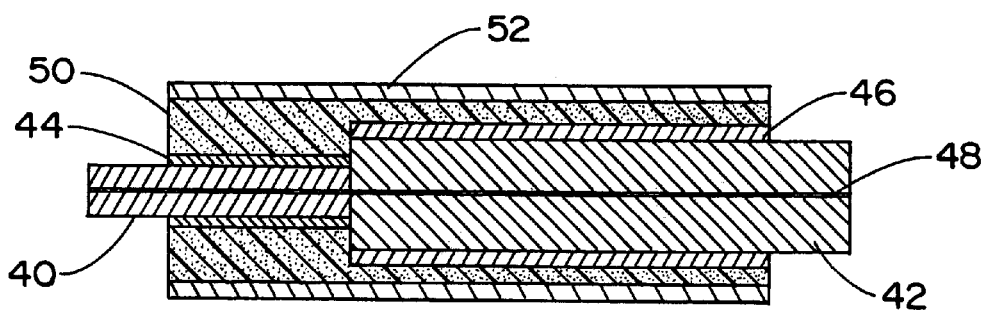
Figure 9:
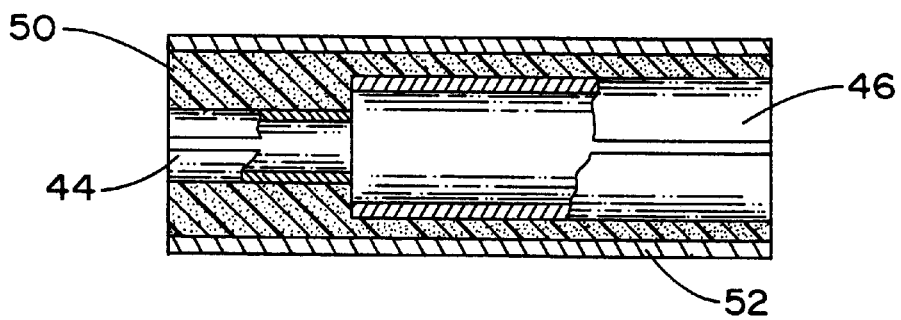

Turning now to FIGS. 7, 8 and 9, steps in a second embodiment of the fabrication method of the invention are illustrated. Ferrules 40 and 42, split sleeves 44 and 46 and gauge 48 correspond to the same elements of the first embodiment and are assembled as in FIG. 2. In addition, a layer of viscous, quick drying, conventional epoxy 50 is applied to the external surfaces of sleeves 44 and 46. The assembly of FIG. 7 is then inserted into cylinder 52, preferably of stainless steel, with epoxy 50 substantially filling the space between the outside surfaces of sleeves 44 and 46 and the inside surface of cylinder 52, as shown in FIG. 8. When epoxy 50 has sufficiently hardened to fix the positions of sleeves 44 and 46 within cylinder 52, gauge 48 and ferrules 40 and 42 are removed, leaving sleeves 44 and 46 permanently encased within cylinder 52, as seen in FIG. 9. Neither cylinder 52 nor sleeves 44 and 46 need be fabricated to close tolerances and the radial spacing between the sleeves and cylinder is not critical. Whether or not the sleeves are coaxial with the cylinder is not important to proper function of the device; coaxial alignment of the sleeves is ensured by assembly of the two sleeves with the ferrules which are coaxially aligned by the gauge prior to fixing the relative positions of the sleeves within the potting agent or cylinder.

What is claimed is:

1. The method of fabricating a device having a pair of hollow, cylindrical sleeves of predetermined inside diameter for frictionally engaging external surface portions of a corresponding pair of cylindrical ferrules of fiber optic connectors for the purpose of holding said ferrules in mutual axial alignment, said method comprising:

a) selecting a pair of ferrules having external diameters and through passageways having dimensions and concentricity within predetermined tolerances;

b) positioning a pair of said sleeves having inside diameter substantially equal to said external diameters in surrounding relation to at least portions of said ferrules;

c) positioning an elongated gauge wire to extend into and at least partially through said passageways of each of said ferrules, thereby placing said pair of ferrules and said pair of sleeves in substantially exact axial alignment;

d) surrounding said sleeves with structure within which the relative positions of said sleeves are permanently fixed; and e) removing said gauge from said ferrules and said ferrules from said sleeves, leaving said sleeves permanently fixed with said structure in substantially exact coaxial alignment.

2. The method of claim 1 wherein said structure is a cylindrical element having an inside diameter larger than the largest outside diameter of said sleeves.

3. The method of claim 2 wherein said cylindrical element is made of stainless steel.

4. The method of claim 2 including the further steps of applying to the external surfaces of said sleeves a material in a flowable state, inserting said sleeves, with said ferrules and gauge positioned therein, in said cylindrical element with said material substantially filling the space between the outside surfaces of said sleeves and the inside surface of said cylindrical element, and causing said material to harden prior to removing said gauge and ferrules.

5. The method of claim 1 including the further steps of placing said sleeves, with said gauge positioned in said ferrules and said ferrules in said sleeves, within a die cavity and injecting a potting agent into said cavity in surrounding relation to said sleeves.

6. The method of fabricating a device having a pair of hollow, cylindrical sleeves of predetermined inside diameter for frictionally engaging external surface portions of a corresponding pair of cylindrical ferrules of fiber optic connectors for the purpose of holding said ferrules in mutual axial alignment, said method comprising:

a) selecting a pair of ferrules having external diameters and through passageways having dimensions and concentricity within predetermined tolerances;

b) positioning a pair of said sleeves having inside diameters substantially equal to said external diameters in surrounding relation to at least portions of said ferrules;

c) positioning an elongated gauge wire to extend into and at least partially through said passageways of each of said ferrules, thereby placing said pair of ferrules and said pair of sleeves in substantially coaxial alignment;

d) placing said sleeves and those portions of said ferrules and said gauge which are within said sleeves into a mold having a cavity with walls spaced radially outwardly from said sleeves;

e) injecting a potting agent in flowable form into said cavity;

f) upon hardening of said potting agent, removing said potting agent from said mold, and removing said ferrules and said gauge from said sleeves, leaving said sleeves within said potting agent to provide said device with said sleeves in substantially exact coaxial relation.

7. The method of claim 6 wherein said pair of sleeves each includes an axial split permitting radial flexing of said sleeves.

8. The method of claim 7 wherein said inside diameters of said sleeves are unequal to one another.

9. The method of claim 6 wherein said ferrules have axial lengths greater than the axial lengths of the sleeves into which they are inserted.

10. The method of claim 9 wherein said sleeves are positioned with opposing ends substantially in a common plane.

11. The method of claim 10 wherein said mold includes at least three separable sections comprising a top, a central body and a bottom section.

12. The method of claim 11 wherein said cavity is positioned entirely within said body section and has an axial length substantially equal to the combined axial lengths of said sleeves.

13. The method of claim 12 wherein each of said top and bottom sections includes a cylindrical recess in axial alignment with said cavity and portions of said ferrules respectively extend into said recesses to support said ferrules and said sleeves within said cavity.

* * * * *